Patented Oct. 25, 1932

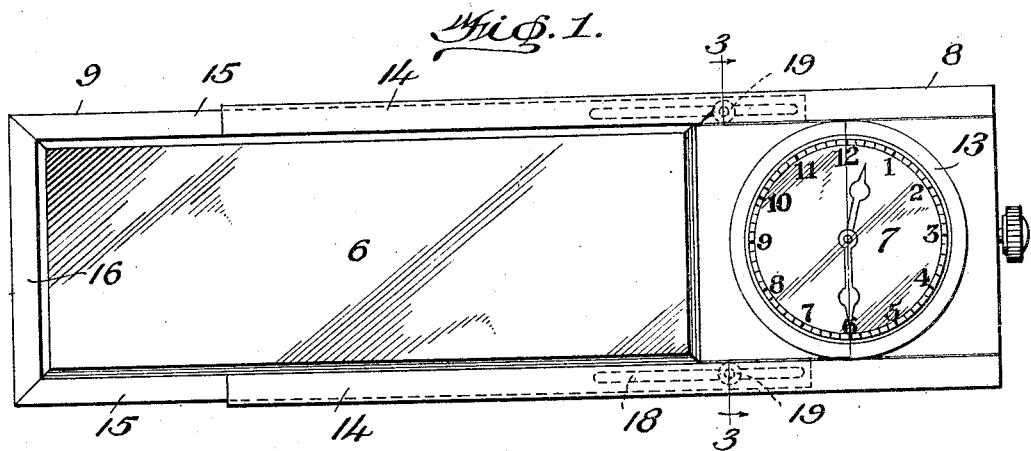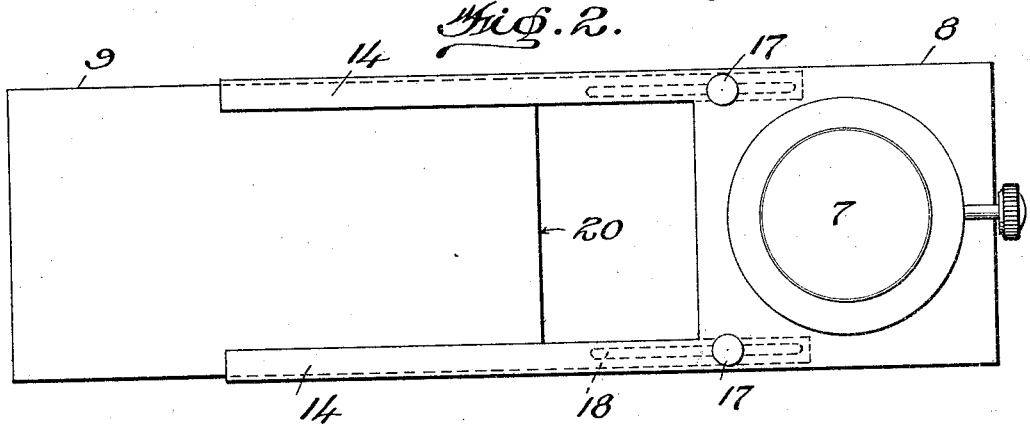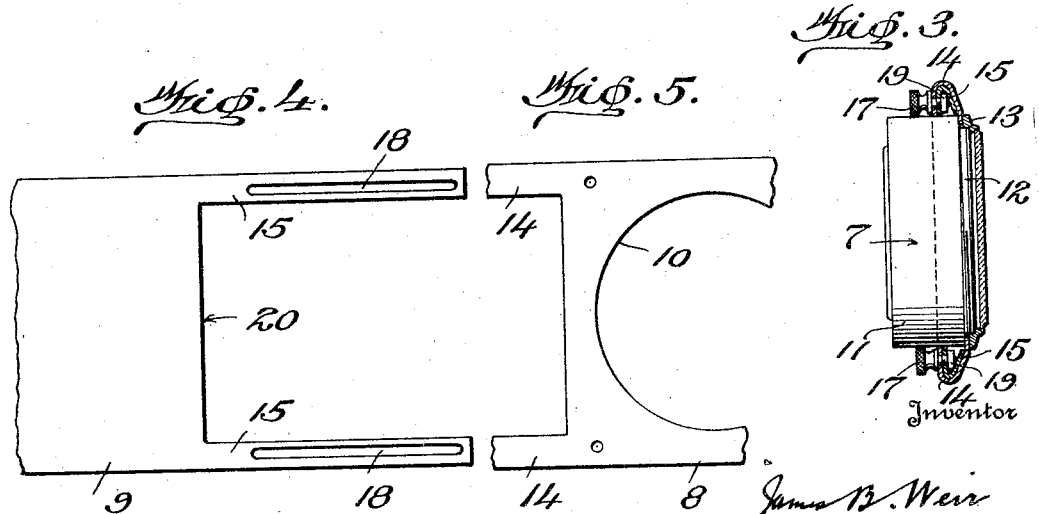

1,884,938

UNITED STATES PATENT OFFICE

JAMES B. WEIR, OF NEW DORP, NEW YORK, ASSIGNOR, BY MESNE ASSIGNMENTS, TO STANDARD MIRROR COMPANY, INC., OF BUFFALO, NEW YORK, A CORPORATION OF NEW YORK

CLOCK AND MIRROR HOLDER

Application filed May 27, 1929. Serial No. 366,472.

This invention relates to holders for mirrors and clocks, and is especially intended for use on automobiles, and the device may be attached by or mounted on any of the ordinary or usual brackets by means of which a rear vision mirror is secured in an automobile.

I am aware that heretofore a mirror has been provided with an opening in which a clock is placed, but this arrangement has the defect that the clock is clamped to the glass, in consequence of which the vibration of the car often cracks the glass because of the weight of the clock, particularly as the glass adjacent the opening is of small extent or is weakened. The same cracking or chipping of the glass is also sometimes produced by the clamping action of the clock, and a further objection is that the mirrors are ordinarily so small that a small clock must be used, and, furthermore the mirror has to be set at such an angle that when a small clock is used it is sometimes difficult to see the hands from the rear seat.

The object of the present invention is to remedy these objections by the provision of a holder for both the mirror and the clock, comprising a metal plate, which forms a backing and support for the mirror and is also provided with an extension at the end in which a clock may be placed and held.

A further object of the invention is to provide such a holder which can be adjusted to hold various sizes of mirrors, as some cars use longer mirrors than others.

As stated the construction is such that the holder can be mounted on an ordinary bracket, so that new or special forms of brackets are not necessary.

The effect of the device is to hold the mirror and clock rigidly, and the weight of the clock is not taken by the mirror, so that cracking of the mirror from vibration or other causes is avoided.

One form of the invention is illustrated in the accompanying drawing in which Fig. 1 is a face view of the device. Fig. 2 is a back view. Fig. 3 is a section on the line 3—3 of Fig. 1. Figs. 4 and 5 are details of the plate sections separated.

In the drawing 6 indicates a mirror and 7 a clock or other timepiece. The holder consists of two back plate sections 8 and 9, conveniently made of metal, and the section 8 has an opening 10 in which the clock fits and in which it may be held by any suitable means. Preferably the back or casing 11 of the clock has a reduced threaded neck or flange 12 which fits through the opening, and the bezel 13 of the clock screws on this flange so that the edge of the metal around the opening is clamped between the bezel and the case and the clock is thereby supported in position in the opening.

The upper and lower edges of the plate 8 are bent or channeled as indicated at 14, and the upper and lower edges of the sections 9 are channeled as indicated at 15, and the end edge also has a corresponding channel 16. The channels 15 are slidable in the channels 14 so that the length of the frame or plate can be adjusted to accommodate mirrors of different lengths, and they are held at adjustment by screws 17 which extend through holes in the channels 14 and slots 18 in the channels 15 engaging nuts 19 in the channels.

When the mirror 6 is put in place its edges are engaged in the channels 14, 15 and 16, and the back section 9 is then slid into the necessary extent and the screws 17 are tightened, thereby holding the mirror, the channels forming clips engaging the edges of the mirror. The mirror thus lies in front of the back plate 9 and is exposed at the front. Said plate 9 is recessed or cut away as indicated at 20 between the channels so that it spans the clock case and permits the plate to be pushed into the extent necessary.

It will be seen that by making the back plate in sections they may not only be adjusted for mirrors of various sizes but a convenient means is provided for inserting the mirror or replacing one when necessary. When applied to an ordinary bracket used on automobiles the arms of the bracket will grip the upper and lower edges of the holder. In this manner the clock and also the mirror are rigidly secured, and either can be removed without displacing the other, and the back plate or holder takes the strains incident to vibration. The parts may be cheaply constructed of sheet metal, and assembly is easy and convenient.

The invention is not limited to the particular construction shown, but various modifications may be made within the scope thereof.

I claim:

1. A panel and instrument holder comprising a back plate formed in two sections each having interfitting channels at the edges, extensible to hold panels of different sizes, said channels engaging the edges of the panel, one of the sections being extended beyond the panel and having an opening to receive an instrument.

2. A panel and instrument holder comprising a back plate formed in two sections each having channeled edges to hold a panel, one section having an opening to receive an instrument and the other section being recessed between the edges to span the instrument, the channels of said sections being slidable upon each other to vary the effective length of the back plate.

In testimony whereof, I affix my signature.

JAMES B. WEIR.